United States Patent [19]
Kim et al.

[11] Patent Number: 5,920,171
[45] Date of Patent: Jul. 6, 1999

[54] STARTING-POINT RETURNING APPARATUS FOR ROBOT

[75] Inventors: Hee-jin Kim; Chan-seob O, both of Suwon, Rep. of Korea

[73] Assignee: Samsung Electronics Co., Ltd., Rep. of Korea

[21] Appl. No.: 08/962,948

[22] Filed: Apr. 10, 1996

[30] Foreign Application Priority Data

Apr. 24, 1995 [KR] Rep. of Korea .......................... 95-9629

[51] Int. Cl.⁶ .................................................. B25J 19/02
[52] U.S. Cl. .................. 318/568.16; 318/603; 318/602; 901/46; 901/47
[58] Field of Search .................... 318/568.1–568.25, 318/600–603, 605, 95.6; 901/1–50

[56] References Cited

U.S. PATENT DOCUMENTS

| | | | |
|---|---|---|---|
| 4,011,487 | 3/1977 | Loomis | 318/138 |
| 4,796,005 | 1/1989 | Ishida et al. | 341/11 |
| 5,003,239 | 3/1991 | Matthews et al. | 318/600 |
| 5,103,225 | 4/1992 | Dolan et al. | 341/13 |

*Primary Examiner*—David Martin
*Attorney, Agent, or Firm*—Burns, Doane, Swecker & Mathis LLP

[57] ABSTRACT

A starting-point returning apparatus of a robot enables the returning to the starting point of an operation arm with a small movement. A controlling portion for returning a first operation arm to the starting point with respect to a support shaft includes a motor controller for controlling the motor, a pulse counter for counting the number of pulses generated from the motor while an aperture is sensed by a sensor, a memory for storing the pulse number of the motor corresponding to the length of each aperture, a position-sensor for sensing a current position of the first operation arm from the pulse number of the motor generated during the aperture-sensing period, an encoder for receiving a pulse signal corresponding to distance from the current position of the first operation arm sensed by the position-sensor to the starting point to the motor controller. Thus, the range, and therefore the time, for returning to the starting point can be minimized.

7 Claims, 4 Drawing Sheets

STARTING-POINT RETURNING APPARATUS FOR ROBOT

BACKGROUND OF THE INVENTION

The present invention relates to a starting-point returning apparatus (hereinafter called a "returning apparatus") for a robot, and more particularly, to a returning apparatus for a robot having an improved structure which minimizes the time needed to return the robot's arm to the starting point of a movement cycle.

As shown in FIG. 1, an industrial robot generally has a multi-articulated structure where first and second operation arms 20 and 30 are rotatably connected with each other on a support shaft 10. The first operation arm 20 is driven by a first motor 21 and a first reduction gear 22, and the second operation arm 30 is driven by a second motor 31 and a second reduction gear 32. Here, the reduction gears 22 and 32 are for driving the operation arms 20 and 30, respectively, through a reduction of the rotation speed of each of the motors 21 and 31 by a gear ratio of, say, 1/50.

In the industrial robot having such a structure, at an initial driving time, the operation arms 20 and 30 are controlled such that the operation arms return to the starting point in which the operation arms are aligned with each other. The returning apparatus, as shown in FIGS. 1 and 2, comprises a disc 40 fixed on the support shaft 10 and having first, second and third dogs 42, 43 and 44 arranged at the perimeter thereof at 120° intervals and a sensor 41 fixed to a rotation shaft 23 of the first operation arm 20 and rotating about the perimeter of the disc 40. Here, the sensor 41 rotates together with the first operation arm 20.

The first and second dogs 42 and 43 are for limiting the left and right rotation ranges of the first operation arm 20, respectively, and the third dog 44 is for indicating the starting point of the first operation arm 20. For example, the first operation arm 20 rotates clockwise till the sensor 41 senses the second dog 43, whereupon the clockwise rotation stops. Here, the rotation range of the first operation arm 20 is 240° and that of the second operation arm 30 is 280°.

Also, the returning apparatus of the second operation arm 30 with respect to the first operation arm 20 has the same structure as above.

The basic operational sequence for returning to the starting point is that the first operation arm 20 first returns to the starting point with respect to the support shaft 10 and then the second operation arm 30 returns to the starting point with respect to the first operation arm 20.

The operation of the conventional returning apparatus having such a structure will now be described with reference to FIGS. 1 and 2. Here, it is assumed that the sensor 41 is disposed between the second and third dogs 43 and 44, and the initial rotating direction for the starting point returning operation is assumed to be clockwise.

Referring to FIG. 2, upon the initial execution of an operation for returning the robot arm to the starting point, the first operation arm 20 rotates clockwise through an arc "a" and stops when the sensor 41 senses the second dog 43. Then, the first operation arm 20 rotates counterclockwise through an arc "b" and stops when the sensor 41 senses the third dog 44, thus reaching the starting point for the first operation arm 20. Accordingly, the total starting-point returning arc of the first operation arm 20 is equal to a+b.

After the first operation arm 20 returns to the starting point as above, the second operation arm 30 returns to its starting point with respect to the first operation arm 20, using the same method.

Meanwhile, when the operation arms 20 and 30 are disposed between the first and third dogs 42 and 44, the returning angle becomes less than 120°. However, when the operation arms 20 and 30 are positioned between the second and third dogs 43 and 44, the returning angle becomes a+b as described above, thus increasing the returning time and the movement range. That is, the returning process is completed only after the operation arms 20 and 30 are moved to one limit position, either the left or right (dog 42 or 43). Thus, the starting-point returning time is long and there is the potential for interference with other peripheral devices disposed in a rotation path of the operation arms 20 and 30.

SUMMARY OF THE INVENTION

To solve the above problems, it is an object of the present invention to provide a returning apparatus of a robot improved such that it can minimize a rotation range of the robot operation arm during returning to the starting point so as to reduce starting point returning time.

Accordingly, to achieve the above object, there is provided a starting-point returning apparatus of a robot including an operation arm rotatably coupled with a support shaft, a motor for driving the operation arm, and returning means for returning the operation arm to a starting point, the returning means comprising: a panel member fixed at the support shaft and formed with a plurality of apertures each having differing lengths and arranged in a predetermined pattern with respect to the starting point; a sensor fixed at the operation arm for sensing the aperture; and control means for controlling the motor so that the operation arm returns to the starting point according to the position of the aperture sensed by the sensor.

Here, the control means comprises: a motor controller for controlling the motor; a pulse counter for counting the number of pulses generated from the motor while the sensor senses the aperture; a memory for storing the pulse number of the motor corresponding to the length of each aperture; a position-sensing portion for sensing a current position of the operation arm from the pulse number of the motor generated during the period of sensing the aperture; and an encoder for inputting a pulse signal corresponding to the distance from the current position of the operation arm sensed by the position-sensing portion to the starting point to the motor controller, whereby the motor controller controls the motor according to the pulse signal input by the encoder so that the operation arm returns to the starting point.

To achieve the above object, there is provided a starting-point returning apparatus of a robot including first and second operation arms rotatably coupled with a support shaft, first and second motors for driving the first and second operation arms, and returning means for returning the second operation arm to a starting point with respect to the first operation arm, the returning means comprising: a panel member fixed at the support shaft and formed with a plurality of apertures each having different lengths and arranged in a predetermined pattern with respect to the starting point; a sensor fixed at the second operation arm for sensing the aperture; and control means for controlling the motor so that the second operation arm returns to the starting point according to the position of the aperture sensed by the sensor.

Here, the control means comprises; a motor controller for controlling the second motor; a pulse counter for counting the number of pulses generated from the second motor while the sensor senses the aperture; a memory for storing the pulse number of the motor corresponding to the length of each aperture; a position-sensing portion for sensing a current position of the second operation arm from the pulse number of the second motor generated during the period of sensing the aperture; and an encoder for inputting a pulse signal corresponding to the distance from the current position of the second operation arm sensed by the position-sensing portion to the starting point to the motor controller, whereby the motor controller controls the motor according to the pulse signal input by the encoder so that the second operation arm returns to the starting point. It is preferred in the present invention that each of the apertures is formed at each section of the panel member equally divided into a predetermined number.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 3:
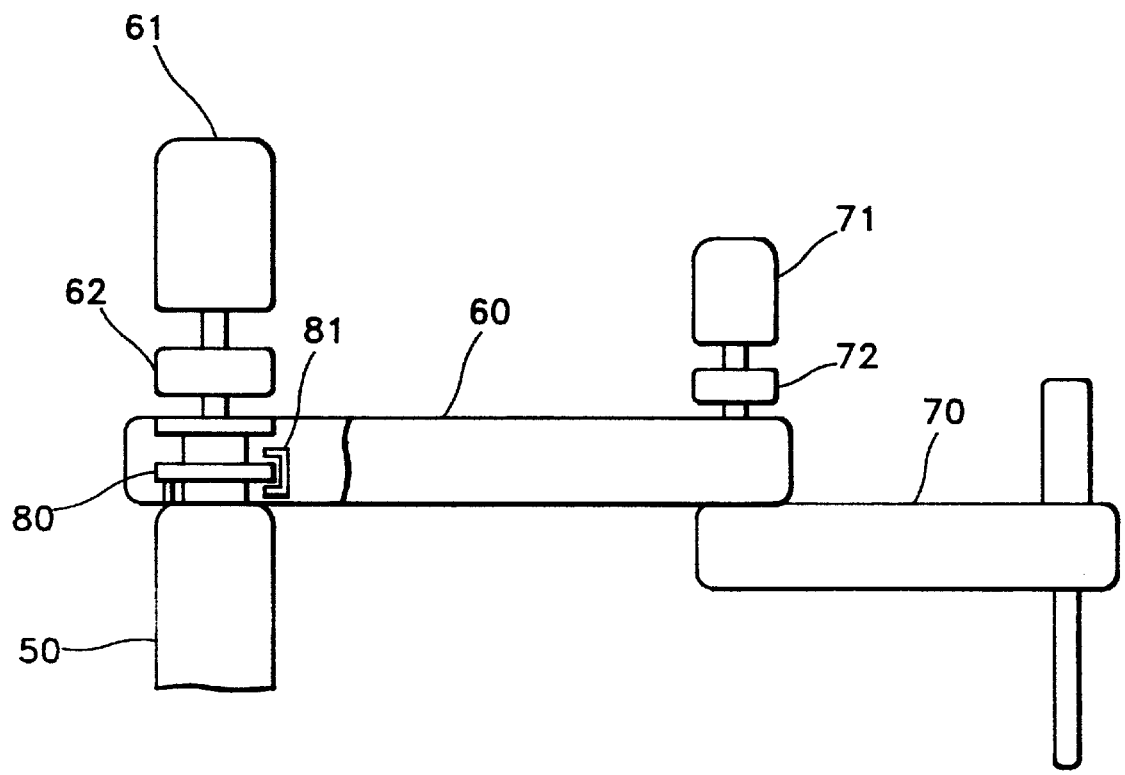
FIG. 3 is a schematic view illustrating an industrial robot adopting a returning apparatus according to the present invention.

Referring to FIG. 3, the returning apparatus has the multi-articulated structure, like the conventional technology, in which the first and second operation arms 60 and 70 are rotatably connected with each other on a support shaft 50. The first operation arm 60 is driven by a first motor 61 and a first reduction gear 62, and the second operation arm 70 is driven by a second motor 71 and a second reduction gear 72. Here, each reduction gear 62 and 72 drives each operation arm 60 and 70 by reducing rotation speed of each motor 61 and 71 by 1/50. For example, when the rotation speed of each motor is 50 rpm, that of each operation arm is 1 rpm.

Figure 4:
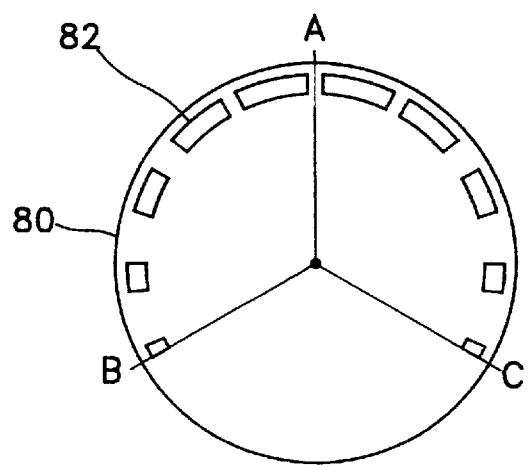
FIGS. 4 and 6 are schematic views illustrating the disc member as adopted in FIG. 3.

The rotation range of the first operation arm 60 is usually about 240° (between perimeter points B and C) as shown in FIG. 4, and that of the second operation arm 70 is about 280°.

Here, the present invention is characterized in that a starting-point returning means (hereinafter referred to as "returning means") for returning the first and second operation arms 60 and 70 to the starting point during the initial driving of the robot.

As shown in FIGS. 3 and 4, the returning means comprises a disc member 80 fixed at the support shaft 50 and formed with a plurality of apertures 82 each having a different length and arranged in a predetermined pattern with respect to a starting point (A), a sensor 81 fixed at the first operation arm 60 so as to be capable of rotating together and for sensing the apertures 82, and a control means for controlling the first motor 61 so that the first operation arm 60 returns to the starting point (A) according to the position of the aperture 82 sensed by the sensor 81.

Figure 7:
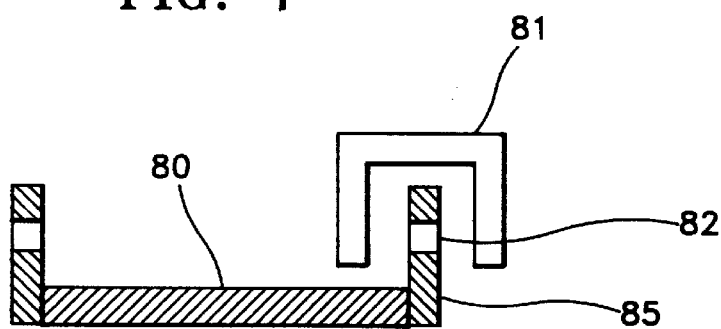
FIG. 7 is a view illustrating a returning apparatus according to another embodiment of the present invention.

Here, the aperture 82 can be formed at a band 85 extended from the circumference of the disc member 80, as shown in FIG. 7.

Figure 5:
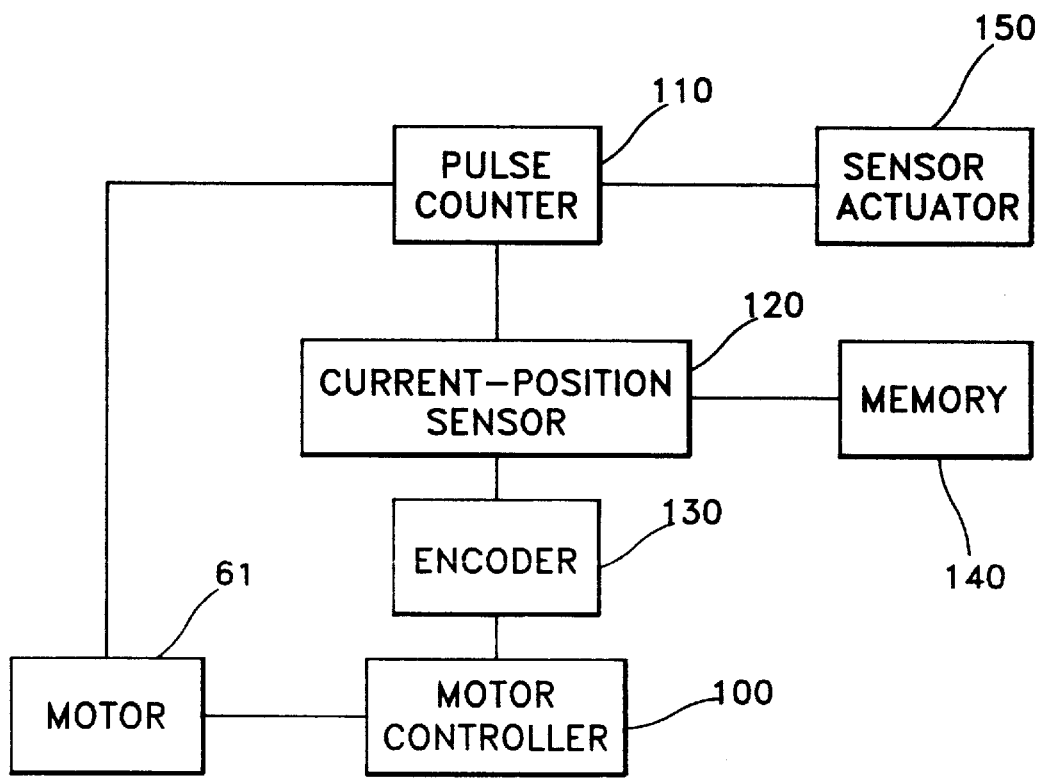
FIG. 5 is a block diagram for explaining the operation of the returning apparatus according to the present invention.

Referring to FIGS. 3 to 5! the control means comprises a motor controller 100 for controlling the first motor 61, a pulse counter 110 for counting the number of pulses generated from the first motor 61 during the time when the sensor 81 senses the aperture 82, a memory 140 for storing the number of the pulses of the first motor 61 corresponding to the length of each aperture 82, i.e., the inherent pulse number of each aperture, a current-position sensor 120 for sensing a current position of the first operation arm 60 from the pulse number of the first motor 61 generated during the sensing period of the aperture 82, an encoder 130 for inputting a pulse signal corresponding to distance from the current position of the first operation arm 60 sensed by the current-position sensor 120 to the starting point (A) to the first motor controller 100, and a sensor actuator 150 for actuating the sensor 81.

In the control means of such a structure, the first motor controller 100 controls the first motor 61 according to the pulse signal input by the encoder 130 so that the first operation arm 60 can return to the starting point (A).

Figure 1:
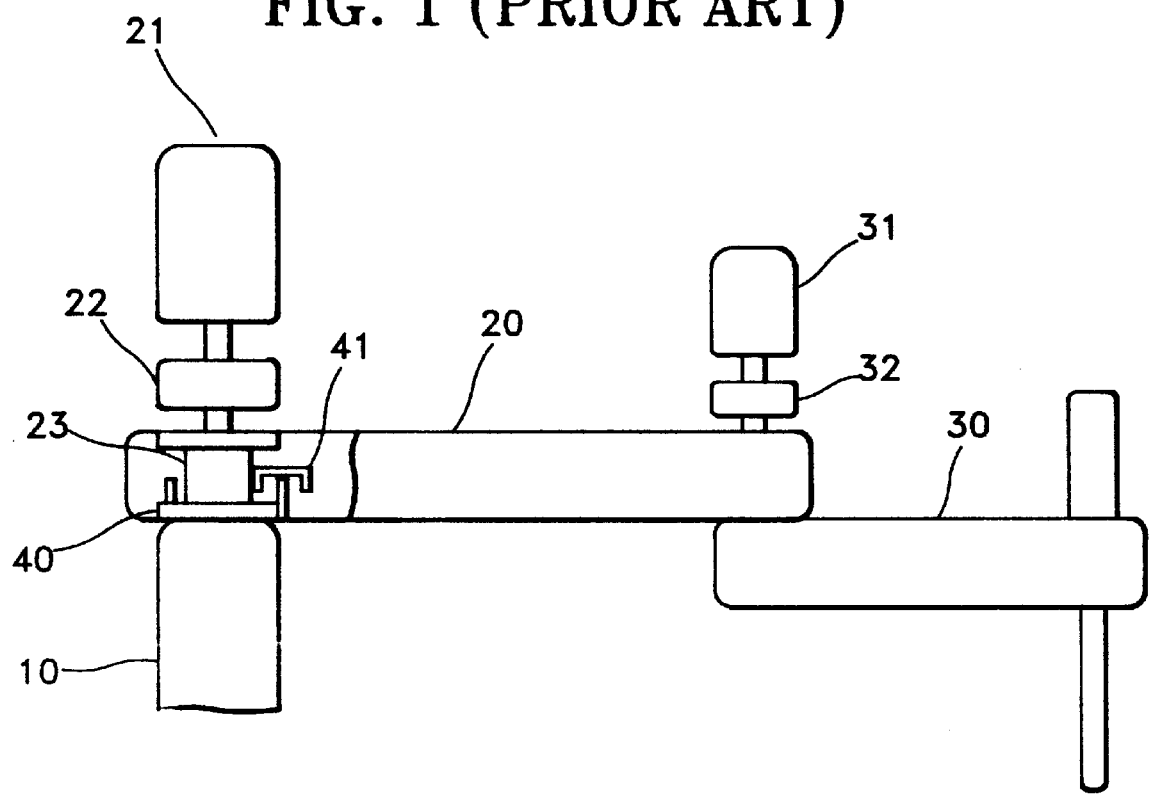
FIG. 1 is a schematic view illustrating an industrial robot adopting a conventional returning apparatus.
Figure 2:
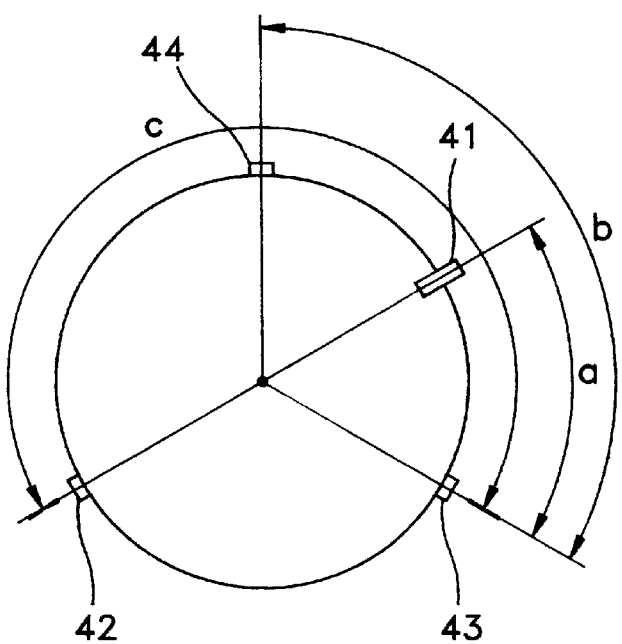
FIG. 2 is a schematic view illustrating a disc member of FIG. 1 for explaining the operation of the conventional returning apparatus.
Figure 6:
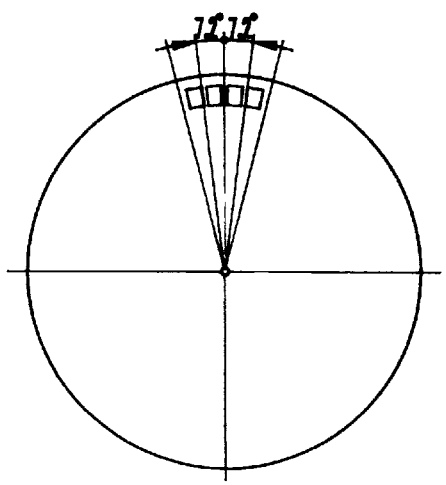

Here, it is preferable that each aperture 82 is formed at each section of the disc member 80 equally divided by a predetermined number; particularly, the number of the sections is equal to a reciprocal of the reduction ratio of the first reduction gear 62. For instance, when the reduction ratio of the first reduction gear 62 is 1/50, the disc member 80 is equally divided into 50 sections and the apertures 82 each having a different length are arranged at the sections, respectively. Here, the angle of each section becomes 7.2° as shown in FIG. 6. Accordingly, when the reduction ratio of the first reduction gear 62 is 1/50, the returning apparatus according to the present invention can determine a returning direction by only a 7.2° movement of the first operation arm 60, at maximum. Thus, contrary to the conventional technology in which the operation arm should move to the left and right limit positions (dog 42 or 43 of FIG. 2), the rotation range of the operation arm of the present invention is greatly reduced so that the starting-point returning time can be curtailed.

Also, as stated above, since each aperture 82 is formed to have a different length, the pulse number of the first motor 61 operating when the sensor 81 senses each aperture 82 has a different value with respect to each aperture 82.

The starting-point returning action of the returning apparatus of the robot having such a structure according to the present invention will now be described.

Figure 8:
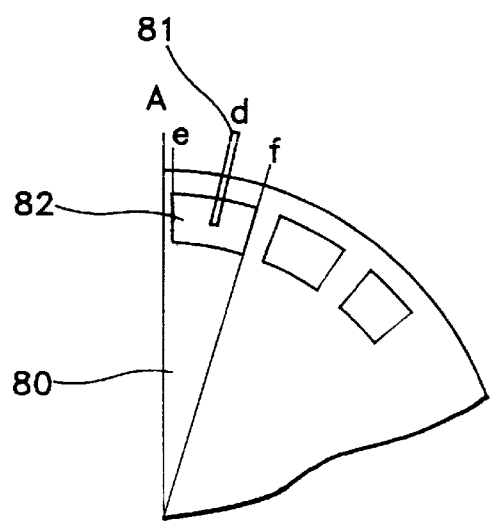
FIGS. 8 and 9 are views each illustrating a portion of the disc member, for explaining the operation of the returning apparatus according to the present invention.

Primarily, as shown in FIG. 8, it is assumed that the initial position of first operation arm 60, i.e., the sensor 81 is placed at a position (d) deviated from the starting point (A) and the initial operation direction of the first operation arm 60 when a starting-point returning button (not shown) is touched counterclockwise. In such a state, when the starting-point returning button is operated, the sensor 81 senses aperture 82. Then, the first operation arm 60 is rotated counterclockwise by the first motor 61, and thus, the sensor 81 is placed at a beginning position (e) of the aperture 82. In such a state, while the first operation arm 60 rotates clockwise, the sensor 81 senses the aperture 82 from the position "e" to a position "f". Here, the pulse counter 110 counts the pulse number generated in the first motor 61 while the position e to f of the aperture 82 is sensed. Next, the current position of the first operation arm 61 is determined by comparing the counted pulse number of the first motor 61 with the inherent pulse number of the aperture 82 stored in the memory 140. Here, the encoder 130 inputs a pulse signal needed for the returning of the first operation arm 60 corresponding to the determined current position, and accordingly, the motor controller 100 controls the first motor 61 so that the first operation arm 60 returns to the starting point (A).

Figure 9:
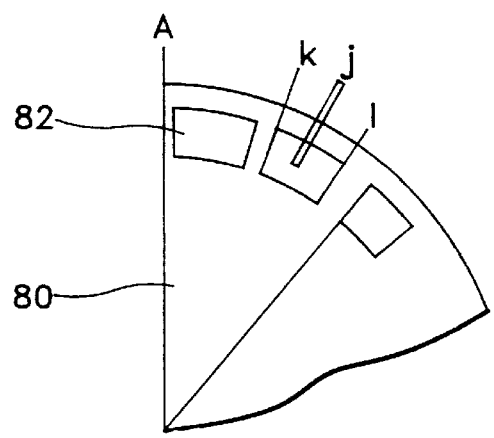

In the meantime, as shown in FIG. 9, when the initial position of the sensor 81 is at a position "j," the first operation arm 60 rotates counterclockwise and then rotates clockwise so as to sense the aperture 82 from positions "k" to "1" thereof. Here, a current position of the first operation arm 60 is determined by comparing the inherent pulse number of the sensed aperture 82 stored in the memory 140 with the pulse number of the first motor 61 generated during the period when the sensor 81 senses the aperture 82. Then, the first operation arm 60 returns to the initial position (A).

Accordingly, since the current position of the first operation arm 60 is recognized by sensing one aperture 82 by the sensor 81 and the aperture 82 is placed within a range of about 7.2°, the returning action can be performed by sensing the current position with a minute movement of the first operation arm 60.

Meanwhile, the returning action of the second operation arm 70 with respect to the first operation arm 60 is performed in such a manner after the same action of the first operation arm 60 with respect to the support 50 is completed as above.

For instance, the disc member 80 can be fixed to the first operation arm 60 and the sensor 81 can be fixed to the second operation arm 70. For the returning control, the motor controller 100 controls the second motor 71 and the pulse counter 110 counts the pulse number of the second motor 71 generated while the sensor 81 senses the aperture 82. The inherent pulse number of each aperture 82, i.e., the pulse number of the second motor 71 corresponding to the length of each aperture 82 is stored in memory 140. The current position sensor 120 determines a current position of the second operation arm 70 from the pulse number of the second motor 71 generated while the sensor 81 senses the aperture 82. The encoder 130 inputs a pulse signal corresponding to the distance between the current position of the second operation arm 70 sensed by the sensor 120 and the initial position (A) to the motor controller 100.

Thus, the motor controller 100 controls the second motor 71 according to the pulse signal input from the encoder 130 so that the second operation arm 70 can return to the starting point with respect to the first operation arm 60.

Here, the current position can be determined by adding the pulse number of a non-penetrated section to that of the aperture 82 so as to perform the returning action. In such a case, an angle of movement section of sensor 81 to determine the current position of the operation arm is exactly 7.2°.

As described above, the returning apparatus according to the present invention has the following merit. That is, contrary to the conventional technology in which the operation arm returns to the starting point after moving to the left or right limit position, the present operation arm returns to the starting point after moving as much as the length of the one aperture so that the returning time of the operation arm for the returning to the starting point can be curtailed.

What is claimed is:

1. A starting-point returning apparatus of a robot including an operation arm rotatably coupled with a support shaft, a motor for driving said operation arm, and returning means for returning said operation arm to a starting point, said returning means comprising:

a disc member fixed at said support shaft and formed with a plurality of apertures each having differing lengths and arranged in a predetermined pattern with respect to the starting point;

a sensor fixed at said operation arm for sensing the aperture; and control means for controlling said motor so that said operation arm returns to the starting point according to the position of the aperture sensed by said sensor, said control means comprising:

a motor controller for controlling said motor;

a pulse counter for counting the number of pulses generated from said motor while said sensor senses said aperture;

a memory for storing the pulse number of said motor corresponding to the length of each aperture;

a position-sensing portion for sensing a current position of said operation arm from the pulse number of said motor generated during the period of sensing said aperture; and an encoder for inputting a pulse signal corresponding to the distance from the current position of said operation arm sensed by said position-sensing portion to the starting point to said motor controller, whereby said motor controller controls said motor according to said pulse signal input by said encoder so that said operation arm returns to the starting point.

2. A starting-point returning apparatus of a robot as claimed in claim 1, wherein each of said apertures is formed at each section of said disc member equally divided into a predetermined number.

3. A starting-point returning apparatus of a robot as claimed in claim 2, further comprising a reduction gear for reducing a rotation speed of said motor by a predetermined reduction ratio and the number of said section is equal to a reciprocal number of the reduction ratio.

4. A starting-point returning apparatus of a robot including first and second operation arms rotatably coupled with a support shaft, first and second motors for driving said first and second operation arms, and returning means for returning said second operation arm to a starting point with respect to said first operation arm, said returning means comprising:

a disc member fixed to said support shaft and formed with a plurality of apertures each having different lengths and arranged in a predetermined pattern with respect to the starting point;

a sensor fixed to said second operation arm for sensing the aperture; and control means for controlling said motor so that said second operation arm returns to the starting point according to the position of the aperture sensed by said sensor, wherein said control means comprises:

a motor controller for controlling said second motor;

a pulse counter for counting the number of pulses generated from said second motor while said sensor senses said aperture;

a memory for storing the pulse number of said motor corresponding to the length of each aperture;

a position-sensing portion for sensing a current position of said second operation arm from the pulse number of said second motor generated during the period of sensing said aperture; and an encoder for inputting a pulse signal corresponding to the distance from the current position of said second operation arm sensed by said position-sensing portion to the starting point to said motor controller, whereby said motor controller controls said motor according to said pulse signal input by said encoder so that said second operation arm returns to the staring point.

5. A starting-point returning apparatus of a robot as claimed in claim 4, wherein each of said apertures is formed at each section of said disc member equally divided into a predetermined number.

6. A starting-point returning apparatus of a robot as claimed in claim 5, further comprising a reduction gear for reducing rotation speed of said second motor by a predetermined reduction ratio and the number of said section is equal to a reciprocal number of the reduction ratio.

7. A starting-point returning apparatus of a robot including an operation arm rotatably coupled with a support shaft, a motor for driving said operation arm, and returning means for returning said operation arm to a starting point, said returning means comprising:

a disc member fixed at said support shaft and formed with first and second plurality of apertures each plurality extending a predetermined degree from the starting point in either direction in the disc, wherein within each plurality each aperture has a different length;

a sensor fixed at said operation arm for sensing the aperture; and control means for controlling said motor so that said operation arm returns to the starting point according to the position of the aperture sensed by said sensor.

* * * * *